US008571500B2

(12) United States Patent
Robson

(10) Patent No.: US 8,571,500 B2
(45) Date of Patent: Oct. 29, 2013

(54) EMERGENCY BROADCAST RECEIVER

(75) Inventor: Stephen James Robson, Garran (AU)

(73) Assignee: Advance Alert Pty Ltd, Yeppoon (AU)

( * ) Notice: Subject to any disclaimer, the term of this patent is extended or adjusted under 35 U.S.C. 154(b) by 327 days.

(21) Appl. No.: 12/935,878

(22) PCT Filed: Apr. 9, 2009

(86) PCT No.: PCT/AU2009/000443
§ 371 (c)(1),
(2), (4) Date: Nov. 3, 2010

(87) PCT Pub. No.: WO2009/124352
PCT Pub. Date: Oct. 15, 2009

(65) Prior Publication Data
US 2011/0136453 A1 Jun. 9, 2011

(30) Foreign Application Priority Data
Apr. 10, 2008 (AU) ................................ 2008901740

(51) Int. Cl.
*H04B 1/18* (2006.01)

(52) U.S. Cl.
USPC .................... 455/150.1; 455/90.1; 455/404.1; 455/573

(58) Field of Classification Search
USPC ........................................................ 455/150.1
See application file for complete search history.

(56) References Cited

U.S. PATENT DOCUMENTS

| | | | | |
|---|---|---|---|---|
| 5,095,308 | A | 3/1992 | Hewitt | |
| 5,109,530 | A | 4/1992 | Stengel | |
| 5,530,924 | A * | 6/1996 | Miller | 455/186.1 |
| 5,574,999 | A | 11/1996 | Gropper | |
| 6,564,073 | B1 * | 5/2003 | Uggmark et al. | 455/573 |
| 6,671,563 | B1 * | 12/2003 | Engelson et al. | 700/2 |
| 7,567,174 | B2 * | 7/2009 | Woodard et al. | 340/539.26 |
| 2004/0100376 | A1 * | 5/2004 | Lye et al. | 340/539.12 |
| 2006/0005219 | A1 | 1/2006 | Owens | |
| 2006/0184962 | A1 * | 8/2006 | Kendall et al. | 725/33 |
| 2007/0239341 | A1 * | 10/2007 | Brikho | 701/93 |
| 2007/0275682 | A1 | 11/2007 | Adachi | |

FOREIGN PATENT DOCUMENTS

| | | |
|---|---|---|
| EP | 1816765 | 8/2007 |
| JP | 2006-319771 | 11/2006 |
| JP | 2007-243936 | 9/2007 |
| JP | 2008-311751 | 12/2008 |
| WO | WO0145386 | 6/2001 |

* cited by examiner

*Primary Examiner* — Ajibola Akinyemi
(74) *Attorney, Agent, or Firm* — Bryan Cave LLP

(57) ABSTRACT

Disclosed is an emergency broadcast radio receiver. The receiver can comprise a signal detector circuit adapted to detect, when powered, a predetermined emergency broadcast signal, and a timing generator circuit adapted to couple a battery to the signal detector circuit to periodically power the signal detector circuit. The receiver also can comprise a demodulator circuit adapted to demodulate, when powered, an audio signal modulated on a radio frequency signal at a tuning frequency. The signal detector circuit can be adapted, on detection of the predetermined emergency broadcast signal, to couple the battery to the demodulator circuit to power the demodulator circuit. Other embodiments are also disclosed.

14 Claims, 4 Drawing Sheets

EMERGENCY BROADCAST RECEIVER

CROSS-REFERENCE TO RELATED APPLICATIONS

This application is a U.S. National Stage Application of and claims priority to International Application No. PCT/AU2009/000443, filed Apr. 9, 2009, which claims priority to Australian Patent Application No. 2008901740, filed Apr. 10, 2008. International Application No. PCT/AU2009/000443 and Australian Patent Application No. 2008901740 are incorporated herein by reference.

FIELD OF THE INVENTION

The present invention relates generally to radio receivers and, in particular, to a radio receiver for detecting an emergency signal and receiving emergency broadcast bulletins.

DESCRIPTION OF THE BACKGROUND

Rapidly unfolding natural or man-made disasters or emergencies such as bushfires, cyclones, and tsunamis have the potential to affect large numbers of people in a short time, with consequential risk to life and property. Such emergencies, which are often of long duration (several days), can evolve unpredictably, so that the population affected by the emergency can change at short notice. The risk to life and property is greatly reduced if people likely to be affected are made aware of the threat and informed of preventive or palliative measures (e.g. evacuation, retreat to shelters) in advance of the actual onset of the emergency.

However, people do not always gather information on an evolving emergency in the same manner. Some people may monitor a certain television station, others a certain radio station, some the Internet, and some may rely on word of mouth. In addition their monitoring may not be constant, but rather intermittent. This presents a challenge to authorities wishing to keep people informed about an emergency developing rapidly in their area of responsibility.

Known solutions including sirens and loudspeakers in public places either fail to reach many affected people or lack informative content. It is expensive and perhaps impractical to ensure wide coverage by broadcasting constant emergency update bulletins on every channel of every possible broadcast medium. Also for a potentially affected person, it can be exhausting to remain alert for updates on an evolving emergency day and night for days on end. These problems may also be exacerbated in remote or Third World regions where communications resources may be limited.

BRIEF DESCRIPTION OF THE DRAWINGS

One or more embodiments of the present invention will now be described with reference to the drawings, in which.

DETAILED DESCRIPTION OF EXAMPLES OF EMBODIMENTS

Figure 1:
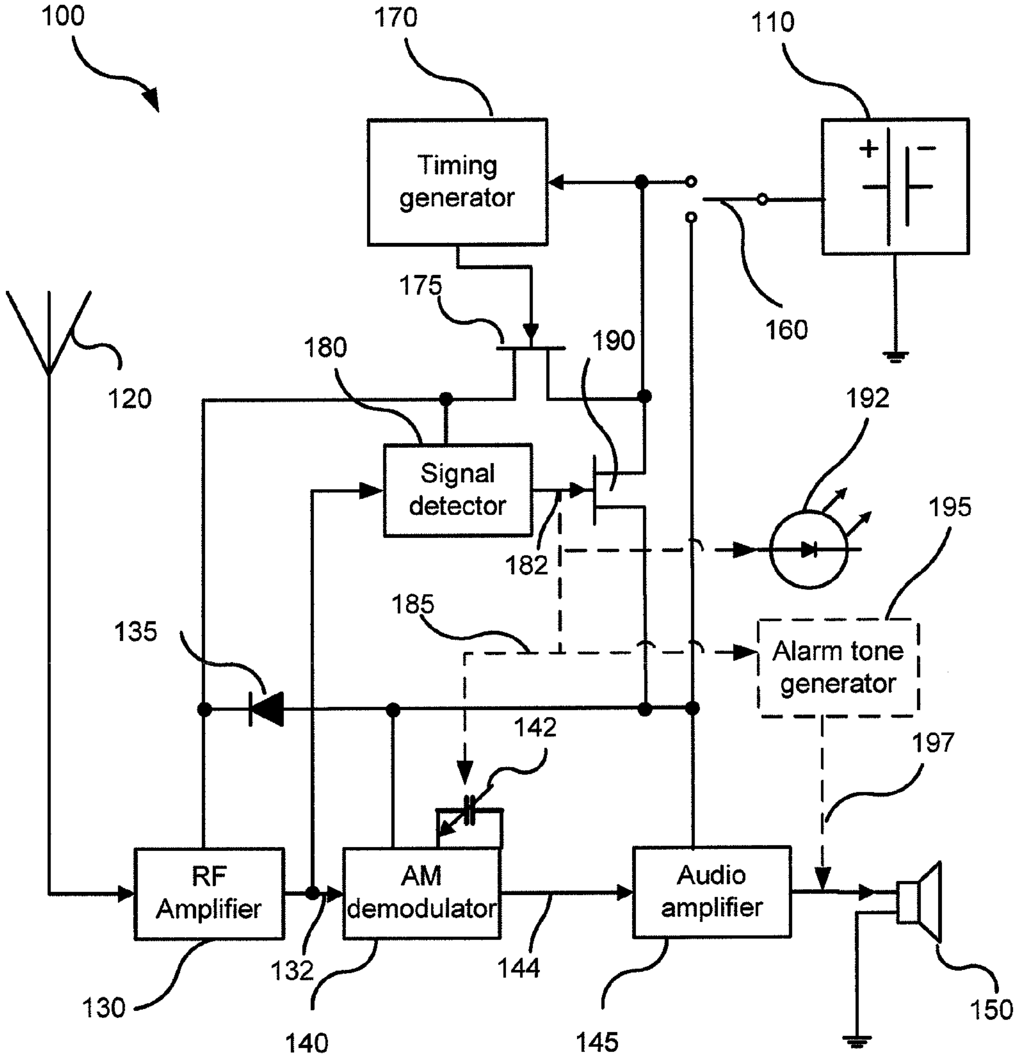
FIG. 1 shows a circuit block diagram for a first emergency broadcast receiver according to the present disclosure.

It is an object of the present embodiments to substantially overcome, or at least ameliorate, one or more disadvantages of existing arrangements.

Disclosed are arrangements which can address at least some of the above problems by providing a radio receiver adapted to monitor, for brief but frequent intervals, a predetermined emergency signal frequency for the presence of a predetermined emergency broadcast signal indicating the imminent broadcast of emergency bulletin information. In this "monitoring" mode, power consumption is extremely low. Once the emergency broadcast signal is detected, the radio receiver is switched to normal operation, optionally emitting an alarm tone to awaken sleeping listeners. If required, the main demodulator is then tuned either manually or automatically to an emergency bulletin frequency on which the emergency bulletin is broadcast.

According to a first aspect of some embodiments, there is provided an emergency broadcast radio receiver comprising a signal detector circuit adapted to detect, when powered, a predetermined emergency broadcast signal; a timing generator circuit adapted to couple a battery to the signal detector circuit to periodically power the signal detector circuit; and a demodulator circuit adapted to demodulate, when powered, an audio signal modulated on a radio frequency signal at a tuning frequency; wherein the signal detector circuit is adapted, on detection of the predetermined emergency broadcast signal, to couple the battery to the demodulator circuit to power the demodulator circuit.

According to a second aspect of some embodiments, there is provided an emergency broadcast system comprising: a transmitter adapted to broadcast a predetermined emergency broadcast signal; a further transmitter adapted to broadcast an audio signal modulated on a radio frequency signal; and a radio receiver, comprising: a signal detector circuit adapted to detect, when powered, a predetermined emergency broadcast signal; a timing generator circuit adapted to couple a battery to the signal detector circuit to periodically power the signal detector circuit; and a demodulator circuit adapted to demodulate, when powered, the audio signal from the radio frequency signal at a tuning frequency, wherein the signal detector circuit is adapted, on detection of the predetermined emergency broadcast signal, to couple the battery to the demodulator circuit to power the demodulator circuit.

According to a third aspect of some embodiments, there is provided a method of demodulating an audio signal from a radio frequency signal comprising coupling a battery to a signal detector circuit so as to periodically power the signal detector circuit; detecting, by the signal detector circuit, when powered, a predetermined emergency broadcast signal; coupling, on detection of the predetermined emergency broadcast signal, the battery to a demodulator circuit to power the demodulator circuit; and demodulating, by the demodulator circuit, when powered, the audio signal from the radio frequency signal at a tuning frequency. Other aspects of various embodiments are also disclosed.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a circuit block diagram for a first emergency broadcast receiver 100 according to the present disclosure. The receiver 100 is powered by a battery 110 that is connected to a manually operable single-pole double-throw switch 160. When the switch 160 is in the lower position, the receiver 100 is in a normal mode of operation, in which battery power is connected to an AM demodulator circuit 140, an audio amplifier circuit 145, and via a diode 135 to a radio frequency (RF) amplifier circuit 130. Under normal operation, the RF amplifier 130 receives and amplifies radio frequency signals detected by an antenna 120. The AM demodulator 140 is manually or electronically tuneable, as illustrated by a variable capacitor 142, to demodulate an audio signal 144 from the amplified RF signal 132 in the so-called AM band using amplitude demodulation at a desired tuning frequency. The resulting audio signal 144 is amplified by the audio amplifier 145 for audible reproduction by a loudspeaker 150. The receiver 100 utilizes the AM band, in which the tuning frequency is in the range of approximately 530 kHz to 1650 kHz, as this band is widely used in most countries and inexpensive receiver components are commonly available.

When the switch 160 is in the upper position, the radio receiver 100 enters a "monitoring" mode of operation in which battery power is decoupled from the AM demodulator 140 and the audio amplifier 145. Instead, the battery 110 is coupled to a timing generator circuit 170. The timing generator circuit 170 is adapted to provide a pulse of duration T1 every T2 seconds, where T2 is much larger (typically by a factor of 10000 or more) than T1. T2 is preferably of the order of the shortest time frame within which emergency information can be expected to be updated, for example several seconds to tens of minutes, typically several minutes. T1 need be no more than the period required for reliable detection of a predetermined emergency broadcast signal, such as a few milliseconds for an AM band signal. The higher the ratio of T2 to T1, the lower will be the power consumption of the radio receiver 100 in the monitoring mode of operation.

The timing pulse generated by the timing generator circuit 170 activates a semiconductor switch 175, for example a junction field effect transistor, through which power from the battery 110 is coupled directly to the RF amplifier 130 and a signal detector circuit 180. The diode 135 ensures that the battery power does not reach the AM demodulator 140 or the audio amplifier 145 when the receiver 100 is operating in the monitoring mode. When so powered, the signal detector 180 analyses the amplified RF signal 132 to detect the presence of the predetermined emergency broadcast signal. When not so powered, the signal detector 180 draws no power from the battery 110. The predetermined emergency broadcast signal, which should be distinctive enough to minimize false detections by the signal detector 180, is broadcast by a transmitter (not shown) on a predetermined emergency signal frequency in the AM band to which the signal detector 180 is permanently tuned.

The detection of the emergency broadcast signal causes the signal detector 180 to assert a detection signal 182 that controls a further semiconductor switch 190. When the detection signal 182 is asserted, power from the battery 110 is coupled via the further switch 190 to the audio amplifier 145, the AM demodulator 140, and via the diode 135 to the RF amplifier 130, thereby bypassing the switch 160. The detection signal 182 remains asserted by the detector 180 for a predetermined period that is long enough to encompass the full length of an emergency bulletin, typically tens of seconds, during which the RF amplifier 130, the AM demodulator 140, and the audio amplifier 145 operate normally to produce an audio signal containing emergency bulletin information for reproduction by the loudspeaker 150. The emergency bulletin is broadcast by the transmitter on a predetermined emergency bulletin frequency. The AM demodulator 140, by virtue of a connection of the detection signal 182 to the variable capacitor 142 (shown as a dashed arrow 185 in FIG. 1), may, on detection of the predetermined emergency broadcast signal, be "auto-tuned" to the emergency bulletin frequency. The emergency broadcast signal can act as an audio alarm tone to waken a sleeping person, once demodulated, amplified, and reproduced by the loudspeaker 150, as described below. If the AM demodulator 140 is manually tuneable, the detection signal 182 is coupled to an LED 192 or other visual display on the receiver 100 to prompt a listener to manually tune the AM demodulator 140 to the emergency bulletin frequency.

In an alternative arrangement, the detection signal 182 is coupled to an alarm tone generator circuit 195 (shown dashed in FIG. 1), which generates, when the detection signal 182 is asserted, an audio alarm tone 197 of sufficient volume to wake a sleeping person when reproduced by the loudspeaker 150. The alarm tone 197 is only generated for a short period so to minimize interference with the emergency bulletin information. If the AM demodulator 140 is manually tuneable, the audio alarm tone 197 prompts a listener to manually tune the AM demodulator 140 to the emergency bulletin frequency. Alternatively, the AM demodulator 140 may "auto-tune" to the emergency bulletin frequency as described above.

Figure 4:
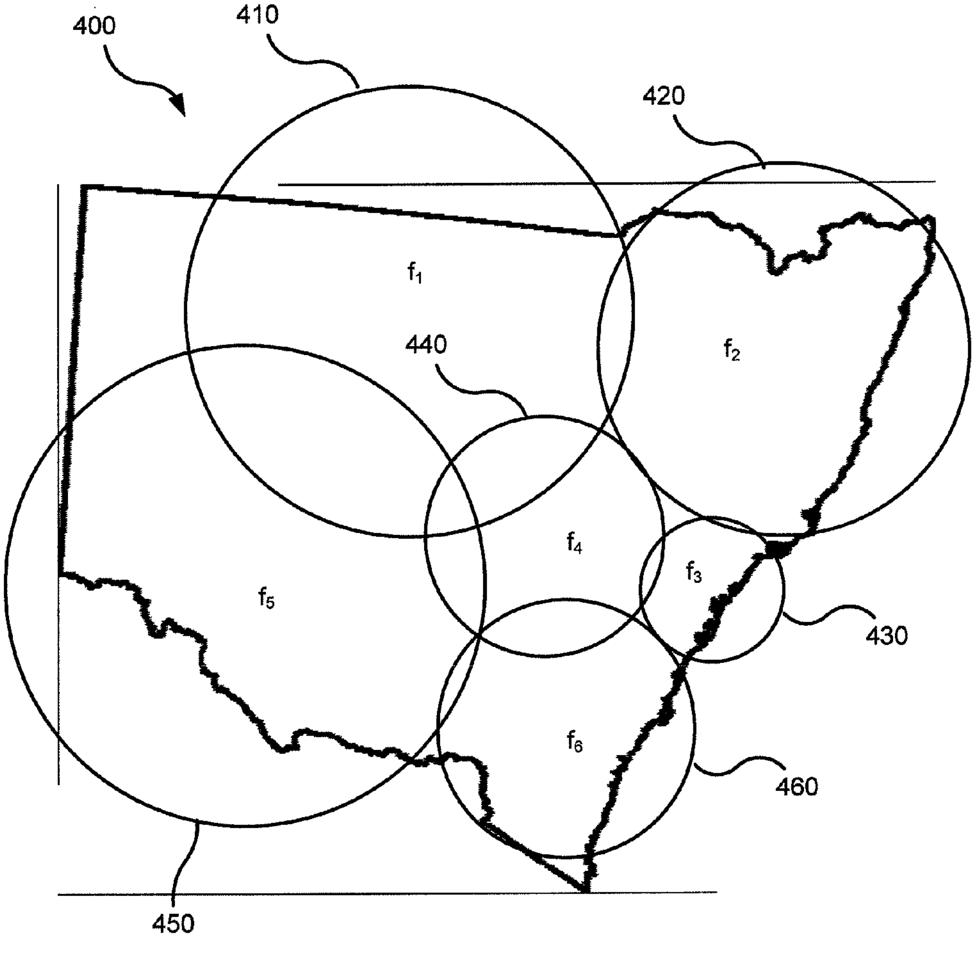
FIG. 4 shows the respective footprints of a set of emergency broadcast frequencies superimposed on a map of New South Wales.

In a further alternative arrangement, the emergency bulletin is transmitted on one of a predetermined set of emergency bulletin frequencies. In this further alternative arrangement, once the detection signal 182 is asserted, the AM demodulator 140 is configured to cycle through the predetermined set of emergency bulletin frequencies to identify and select the frequency containing the emergency bulletin information. In one implementation, the selected emergency bulletin frequency is the frequency of the set on which the demodulated audio signal has the greatest power. The receiver 100 may thereby be a single design of which multiple instances are distributed over a wide area, and the allocation of the frequency spectrum varies over the area so that use of a single emergency bulletin frequency over the whole area is not practical. This arrangement not only permits better targeted emergency broadcasts, but also permits different emergency broadcasts in adjacent zones of reception. As an example, FIG. 4 shows the respective footprints 410 to 460 of a set of emergency broadcast frequencies $f_1$ to $f_6$ respectively, superimposed on a map 400 of New South Wales. The footprints 410 to 460 represent the various zones of reception. A traveler equipped with a receiver 100 according to this further alternative arrangement on a journey through the state might pass through several reception zones, each with a different emergency bulletin being broadcast simultaneously on the corresponding emergency bulletin frequency. For example, a bulletin describing a bushfire emergency may be being broadcast in the metropolitan zone 430, where the traveler commences his journey, on the emergency bulletin frequency $f_3$, while a bulletin describing a flood warning may be being broadcast in the northern rivers zone 420, where the traveler's journey ends, on the emergency bulletin frequency $f_2$.

Figure 2:
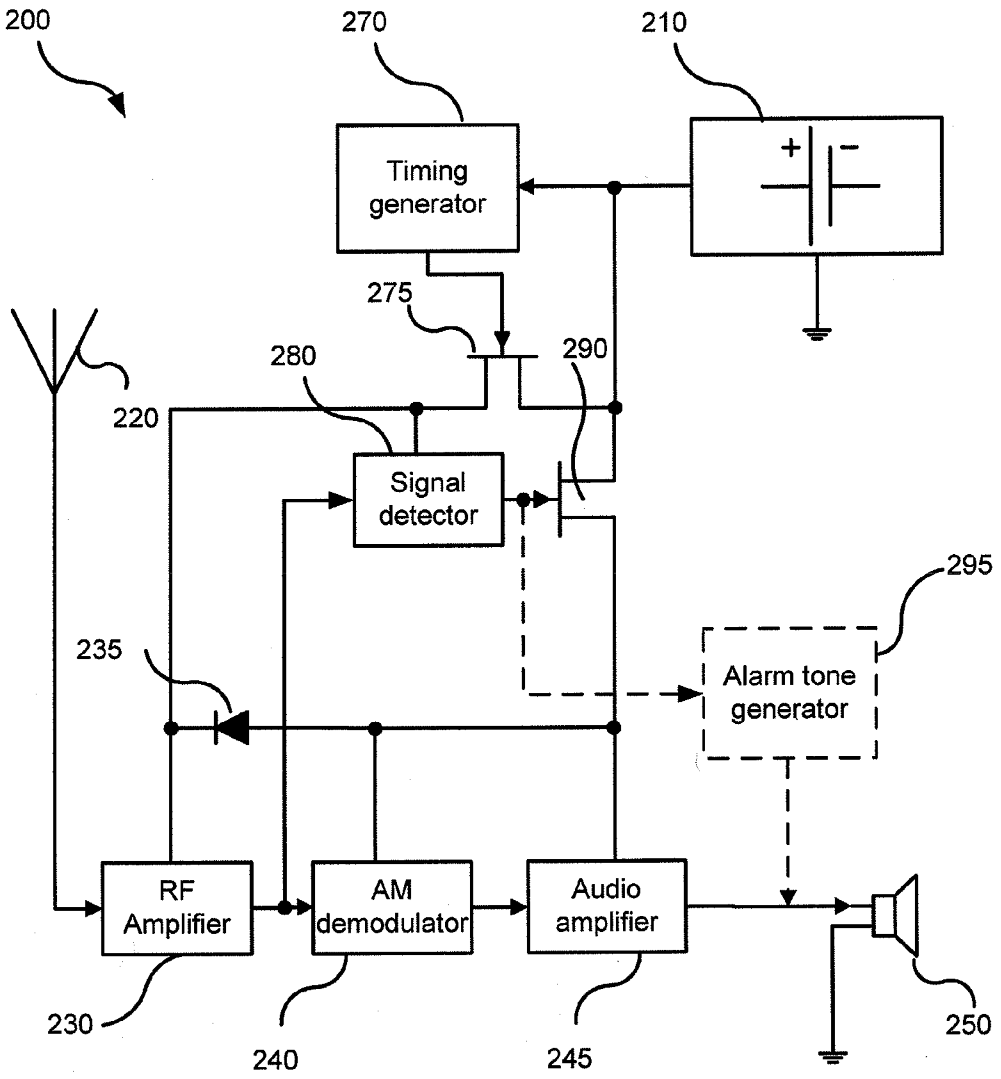
FIG. 2 shows a circuit block diagram for a second emergency broadcast receiver according to the present disclosure.

FIG. 2 shows a circuit block diagram for a second emergency broadcast receiver 200 according to the present disclosure. The receiver 200 is similar to the receiver 100 except that the receiver 200 lacks a manually operable switch, and the AM demodulator 240 is fixed to a single emergency bulletin frequency rather than being tuneable to any AM tuning frequency. Otherwise, the elements 210 to 295 of the receiver 200 act as do the corresponding elements 110 to 195 in the receiver 100. The receiver 200 is therefore only useful as a dedicated emergency broadcast receiver, but may be manufactured even more inexpensively than the receiver 100. As with the receiver 100, the receiver 200 may contain an alarm tone generator 295, or the emergency broadcast signal itself may act as the audio alarm tone as described below.

Figure 3A:
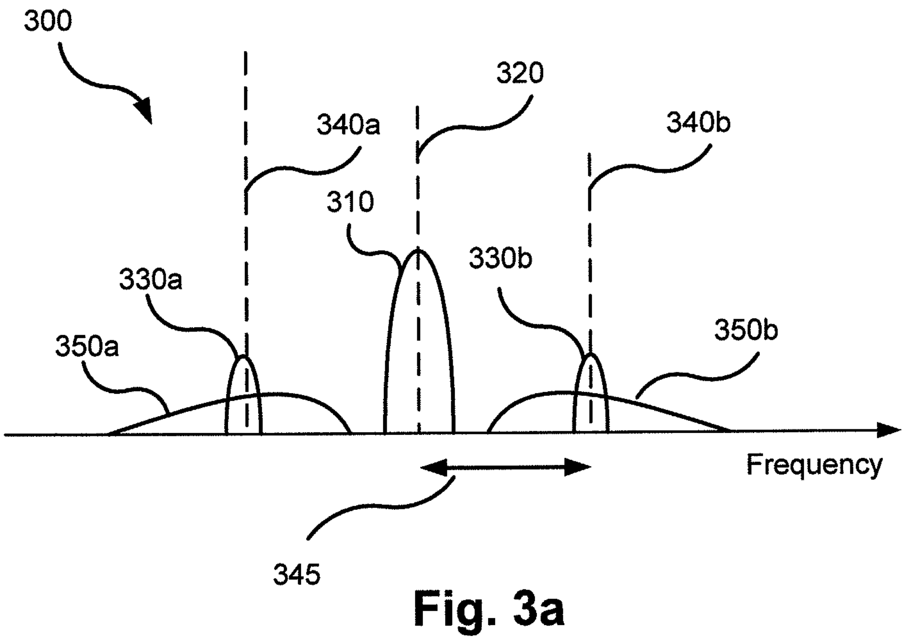
FIG. 3*a* illustrates the frequency spectrum for a possible configuration of emergency broadcast signal and emergency bulletin information in the AM band.

FIG. 3*a* illustrates the frequency spectrum 300 for a possible configuration of emergency broadcast signal and emergency bulletin information in the AM band. The emergency bulletin information is contained in two sidebands 350*a* and 350*b* on either side of an emergency bulletin frequency 320 at which a carrier signal 310 is found in conventional AM modulation. The carrier signal 310 could comprise the emergency broadcast signal, in which case the emergency signal frequency to which the signal detector 180 is tuned is the emergency bulletin frequency 320. Alternatively, if the emergency broadcast signal is contained in two sidebands 330*a* and 330*b* around the emergency bulletin frequency 320, the emergency signal frequency would be 340*a* or 340*b*. Such an emergency broadcast signal is capable of acting as the audio alarm tone in the arrangements described above, because when the AM demodulator 140 is tuned to the emergency bulletin frequency 320, the emergency broadcast signal 330*a*/330*b* would be heard as an audio tone of frequency 345, i.e. the emergency signal frequency 340*b* minus the emergency bulletin frequency 320.

Figure 3B:
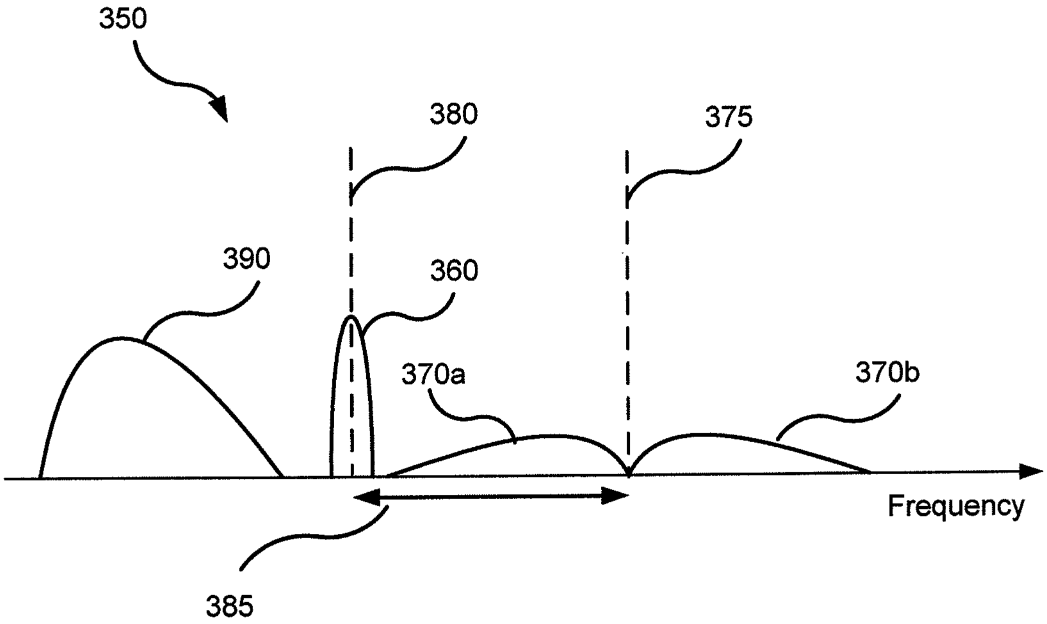
FIG. 3*b* illustrates the frequency spectrum for a possible configuration of emergency broadcast signal and emergency bulletin information in the FM band.

Further variants of the two AM receivers 100 and 200 of FIGS. 1 and 2 make use of the FM band rather than the AM band, so the demodulator 140/240 is adapted in the variants to demodulate signals from the FM band. FIG. 3*b* illustrates the frequency spectrum 350 for a possible configuration of emergency broadcast signal and emergency bulletin information in the FM band. The emergency bulletin information (in stereo) is contained in two "difference sidebands" 370*a* and 370*b* on either side of an emergency bulletin frequency 375, and a "sum sideband" 390. A pilot tone 360 at a pilot tone frequency 380 comprises the emergency broadcast signal, so the emergency signal frequency to which the signal detector 180 is tuned is the pilot tone frequency 380. The pilot tone 360, demodulated by the demodulator 140/240, is capable of acting as the audio alarm tone in the arrangements described above, because when the FM demodulator 240 is tuned to the emergency bulletin frequency 375, the emergency broadcast signal 360 would be heard as an audio tone of frequency 385, i.e. the emergency bulletin frequency 375 minus the emergency signal frequency 380.

In more intelligent variants of the receivers 100 and 200, the emergency broadcast signal itself could carry information, such as by modulating a binary code onto the emergency broadcast signal using conventional binary modulation schemes. Different binary codes would be associated with different classifications of emergency bulletin information, e.g. "most urgent", "less urgent", and "not urgent". The signal detector 180/280 would be adapted to demodulate the binary code and to assert the detection signal 182/282 depending on the classification of the emergency bulletin as indicated by the binary code and, optionally, an internal setting of the receiver 100/200 that is manually adjustable by the user. For example, in the "urgency" classification of emergency bulletins mentioned above, the user could set an "urgency" setting to cause the receiver to ignore all but the "most urgent" class of emergency bulletins.

The arrangements described provide for inexpensive radio receivers useful for monitoring the broadcast airwaves and alerting people to emergency bulletins.

The foregoing describes only some embodiments of the present invention, and modifications and/or changes can be made thereto without departing from the scope and spirit of the invention, the embodiments being illustrative and not restrictive.

What is claimed is:

1. An emergency broadcast radio receiver comprising:

a signal detector circuit, when powered, adapted to detect a predetermined emergency broadcast signal;

a timing generator circuit adapted to couple a battery to the signal detector circuit to periodically power the signal detector circuit; and a demodulator circuit, when powered, adapted to demodulate an audio signal modulated on a radio frequency signal at a tuning frequency;

wherein:

the signal detector circuit, on detection of the predetermined emergency broadcast signal, is adapted to couple the battery to the demodulator circuit to power the demodulator circuit; and the emergency broadcast radio receiver is adapted to set the tuning frequency to one of a plurality of predetermined emergency bulletin frequencies on detection of the predetermined emergency broadcast signal by the signal detector circuit, a setting of the tuning frequency being dependent on a power of demodulated audio signal at each of the plurality of the predetermined emergency bulletin frequencies, wherein the audio signal modulated on the radio frequency signal on at least the one of the plurality of the predetermined emergency bulletin frequencies contains emergency bulletin information.

2. The emergency broadcast radio receiver according to claim 1, further comprising an alarm tone generator, on detection of the predetermined emergency broadcast signal by the signal detector circuit, adapted to generate an audio alarm tone.

3. The emergency broadcast radio receiver according to claim 1, wherein the predetermined emergency broadcast signal acts as an audio alarm tone on demodulation by the demodulator circuit tuned to the one of the plurality of the predetermined emergency bulletin frequencies.

4. The emergency broadcast radio receiver according to claim 1, wherein the demodulator circuit is an AM demodulator.

5. The emergency broadcast radio receiver according to claim 4, wherein a carrier signal of the radio frequency signal comprises the predetermined emergency broadcast signal.

6. The emergency broadcast radio receiver according to claim 1, wherein the demodulator circuit is an FM demodulator.

7. The emergency broadcast radio receiver according to claim 6, wherein a pilot tone of the radio frequency signal comprises the predetermined emergency broadcast signal.

8. The emergency broadcast radio receiver according to claim 1, wherein the predetermined emergency broadcast signal encodes a classification of emergency bulletin information, the signal detector circuit being adapted to decode the classification of the emergency bulletin information.

9. The emergency broadcast radio receiver according to claim 8, wherein the coupling of the battery to the demodulator circuit by the signal detector circuit is dependent on the classification of the emergency bulletin information.

10. An emergency broadcast system comprising:

a transmitter adapted to broadcast a predetermined emergency broadcast signal;

a further transmitter adapted to broadcast an audio signal modulated on a radio frequency signal; and a radio receiver, comprising:

a signal detector circuit, when powered, adapted to detect the predetermined emergency broadcast signal;

a timing generator circuit adapted to couple a battery to the signal detector circuit to periodically power the signal detector circuit; and a demodulator circuit adapted, when powered, to demodulate the audio signal from the radio frequency signal at a tuning frequency;

wherein:

the signal detector circuit, on detection of the predetermined emergency broadcast signal, is adapted to couple the battery to the demodulator circuit to power the demodulator circuit, and the radio receiver is adapted to set the tuning frequency to one of a plurality of predetermined emergency bulletin frequencies on detection of the predetermined emergency broadcast signal by the signal detector circuit, a setting of the tuning frequency being dependent on a power of demodulated audio signal at each of the plurality of the predetermined emergency bulletin frequencies, wherein the audio signal modulated on the radio frequency signal on at least the one of the plurality of the predetermined emergency bulletin frequencies contains emergency bulletin information.

11. The emergency broadcast system according to claim 10, further comprising an alarm tone generator adapted to generate an audio alarm tone on detection of the predetermined emergency broadcast signal by the signal detector circuit.

12. A method of demodulating an audio signal from a radio frequency signal, the method comprising:

coupling a battery to a signal detector circuit so as to periodically power the signal detector circuit;

detecting, by the signal detector circuit, when powered, a predetermined emergency broadcast signal;

coupling, on detection of the predetermined emergency broadcast signal, by the signal detector circuit, when powered, the battery to a demodulator circuit to power the demodulator circuit;

demodulating, by the demodulator circuit, when powered, the audio signal from the radio frequency signal at a tuning frequency; and setting the tuning frequency to one of a plurality of predetermined emergency bulletin frequencies on detection of the predetermined emergency broadcast signal, the setting of the tuning frequency being dependent on a power of demodulated audio signal at each of the plurality of the predetermined emergency bulletin frequencies, wherein the audio signal modulated on the radio frequency signal on at least the one of the plurality of the predetermined emergency bulletin frequencies contains emergency bulletin information.

13. The method according to claim 12, wherein detecting the predetermined emergency broadcast signal comprises:

demodulating, using a demodulator, the audio signal on the radio frequency signal at the tuning frequency; and detecting the predetermined emergency broadcast signal in the audio signal.

14. The method according to claim 12, wherein the predetermined emergency broadcast signal acts as an audio alarm tone on demodulation by the demodulator circuit.

* * * * *